(12) United States Patent
Grzonkowski et al.

(10) Patent No.: US 10,482,244 B1
(45) Date of Patent: Nov. 19, 2019

(54) SYSTEMS AND METHODS FOR EFFICIENTLY MATCHING FILES

(71) Applicant: Symantec Corporation, Mountain View, CA (US)

(72) Inventors: Slawomir Grzonkowski, Dublin (IE); Piotr Krysiuk, Dublin (IE)

(73) Assignee: Symantec Corporation, Mountain View, CA (US)

( * ) Notice: Subject to any disclaimer, the term of this patent is extended or adjusted under 35 U.S.C. 154(b) by 259 days.

(21) Appl. No.: 15/468,153

(22) Filed: Mar. 24, 2017

(51) Int. Cl.
*H04L 29/06* (2006.01)
*G06F 21/56* (2013.01)
*G06F 16/14* (2019.01)

(52) U.S. Cl.
CPC .............. *G06F 21/56* (2013.01); *G06F 16/14* (2019.01); *G06F 2221/034* (2013.01)

(58) Field of Classification Search
CPC ............. H04L 63/1416; H04L 63/1408; H04L 63/1441; H04L 63/1458; G06F 21/552
USPC ......................................................... 726/22
See application file for complete search history.

(56) References Cited

U.S. PATENT DOCUMENTS

2008/0250018 A1* 10/2008 Geffner ................ G06F 21/564
2015/0339736 A1* 11/2015 Bennett ................ G06Q 30/016
705/306

OTHER PUBLICATIONS

Tian et al.; Function Length as a Tool for Malware Classification; 2008 IEEE.
Anderson et al.; Graph-based malware detection using dynamic analysis; Nov. 2011; Graph-based_malware_detection_using_dynamic_analys.pdf.

* cited by examiner

*Primary Examiner* — Evans Desrosiers
(74) *Attorney, Agent, or Firm* — FisherBroyles, LLP

(57) ABSTRACT

The disclosed computer-implemented method for efficiently matching files may include (i) analyzing a file to identify a set of functions within the file and relationships between functions within the set of functions, (ii) creating a set of representations for the set of functions by, for each function, combining a representation of a size of the function with a representation of a size of each function identified, when analyzing the file, as having a relationship to the function, (iii) comparing the set of representations of the set of functions with a set of representations of an additional set of functions identified within an additional file, and (iv) determining, based on comparing the sets of representations, that the file matches the additional file. Various other methods, systems, and computer-readable media are also disclosed.

17 Claims, 7 Drawing Sheets

SYSTEMS AND METHODS FOR EFFICIENTLY MATCHING FILES

BACKGROUND

Viruses, Trojans, spyware, and other kinds of malware are a constant threat to any computing device that requires network connectivity. Malware can delete or encrypt important files on computing devices, download additional malware, spy on a user's behavior, use a user's computing device as part of a botnet to carry out large-scale malicious behavior, or perform any of a number of other harmful actions. Many different types of security systems exist to combat these threats, ranging from browser plug-ins to virus scanners to firewalls, and beyond. Countless new instances and permutations of malware are created every day, requiring security systems to constantly analyze new files to determine whether those files are malicious or benign. In some cases, security systems may compare new files to previously identified malicious files in order to determine whether the new files are new instances of already-discovered malware. Malware isn't the only area in which it is useful to determine when a file is a complete or partial copy of another file. For example, data loss prevention systems may also match files, as may systems for determining whether a file contains re-used code.

Traditional systems for comparing files may involve lengthy analysis of the new file, consuming a significant amount of computing resources. Some traditional systems for matching files may only be capable of matching identical files, allowing attackers to thwart the systems by changing minor details of files. The instant disclosure, therefore, identifies and addresses a need for systems and methods for efficiently matching files.

SUMMARY

As will be described in greater detail below, the instant disclosure describes various systems and methods for efficiently matching files.

In one example, a computer-implemented method for efficiently matching files may include (i) analyzing a file to identify a set of functions within the file and relationships between functions within the set of functions, (ii) creating a set of representations for the set of functions by, for each function within the set of functions, combining a representation of a size of the function with a representation of a size of each function identified, when analyzing the file, as having a relationship to the function, (iii) comparing the set of representations of the set of functions with a set of representations of an additional set of functions identified within an additional file, and (iv) determining, based on comparing the set of representations of the set of functions with the set of representations of the additional set of functions identified within the additional file, that the file matches the additional file.

In one embodiment, the computer-implemented method may further include determining, based on determining that the file matches the additional file, that the file is malicious. In some examples, the computer-implemented method may further include performing a security action on the file in response to determining that the file is malicious. In one embodiment, the security action may include quarantining the file.

In some examples, analyzing the file to identify the set of functions within the file and the relationships between the set of functions may include disassembling the file. In some examples, identifying relationships between functions within the set of functions may include identifying a calling relationship between a calling function within the set of functions and a called function within the set of functions by determining that the calling function calls the called function.

In some embodiments, creating the set of representations for the set of functions may include combining a representation of a total number of instructions within a given function with a representation of the total number of instructions within each function identified as having the relationship to the given function. In one embodiment, creating the set of representations for the set of functions may include creating a string by appending, to the representation of the size of the function, in a predetermined order, the representation of the size of each function that has a relationship to the function and hashing the string formed by appending the representations.

In one embodiment, the representation of the size of the function may include a measurement of the size of the function rounded to a nearest element of a predetermined numeric sequence that exhibits greater-than-linear growth. In some examples, comparing the set of representations of the set of functions with the set of representations of the additional set of functions identified within the additional file may include comparing a subset of the set of representations of the functions with a subset of the set of representations of the additional set of functions identified within the additional file.

In some examples, comparing the set of representations of the set of functions with the set of representations of the additional set of functions identified within the additional file may include comparing the set of representations of the set of functions with a group of sets of representations of a group of sets of functions identified within a group of files stored in a library of comparison reference files. Additionally or alternatively, comparing the set of representations of the set of functions with the set of representations of the set of functions identified within the additional file may include training a machine learning classifier on a training set of data that includes the set of representations of the set of functions and using the machine learning classifier to compare the set of representations of the set of functions with the set of representations of the set of functions identified within the additional file.

In one embodiment, a system for implementing the above-described method may include (i) an analysis module, stored in memory, that analyzes a file to identify a set of functions within the file and relationships between functions within the set of functions, (ii) a creation module, stored in memory, that creates a set of representations for the set of functions by, for each function within the set of functions, combining a representation of a size of the function with a representation of a size of each function identified, when analyzing the file, as having a relationship to the function, (iii) a comparison module, stored in memory, that compares the set of representations of the set of functions with a set of representations of an additional set of functions identified within an additional file, (iv) a determination module, stored in memory, that determines, based on comparing the set of representations of the set of functions with the set of representations of the additional set of functions identified within the additional file, that the file matches the additional file, and (v) at least one physical processor configured to execute the analysis module, the creation module, the comparison module, and the determination module.

In some examples, the above-described method may be encoded as computer-readable instructions on a non-transitory computer-readable medium. For example, a computer-readable medium may include one or more computer-executable instructions that, when executed by at least one processor of a computing device, may cause the computing device to (i) analyze a file to identify a set of functions within the file and relationships between functions within the set of functions, (ii) create a set of representations for the set of functions by, for each function within the set of functions, combining a representation of a size of the function with a representation of a size of each function identified, when analyzing the file, as having a relationship to the function, (iii) compare the set of representations of the set of functions with a set of representations of an additional set of functions identified within an additional file, and (iv) determine, based on comparing the set of representations of the set of functions with the set of representations of the additional set of functions identified within the additional file, that the file matches the additional file.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of example embodiments and are a part of the specification. Together with the following description, these drawings demonstrate and explain various principles of the instant disclosure.

Figure 1:
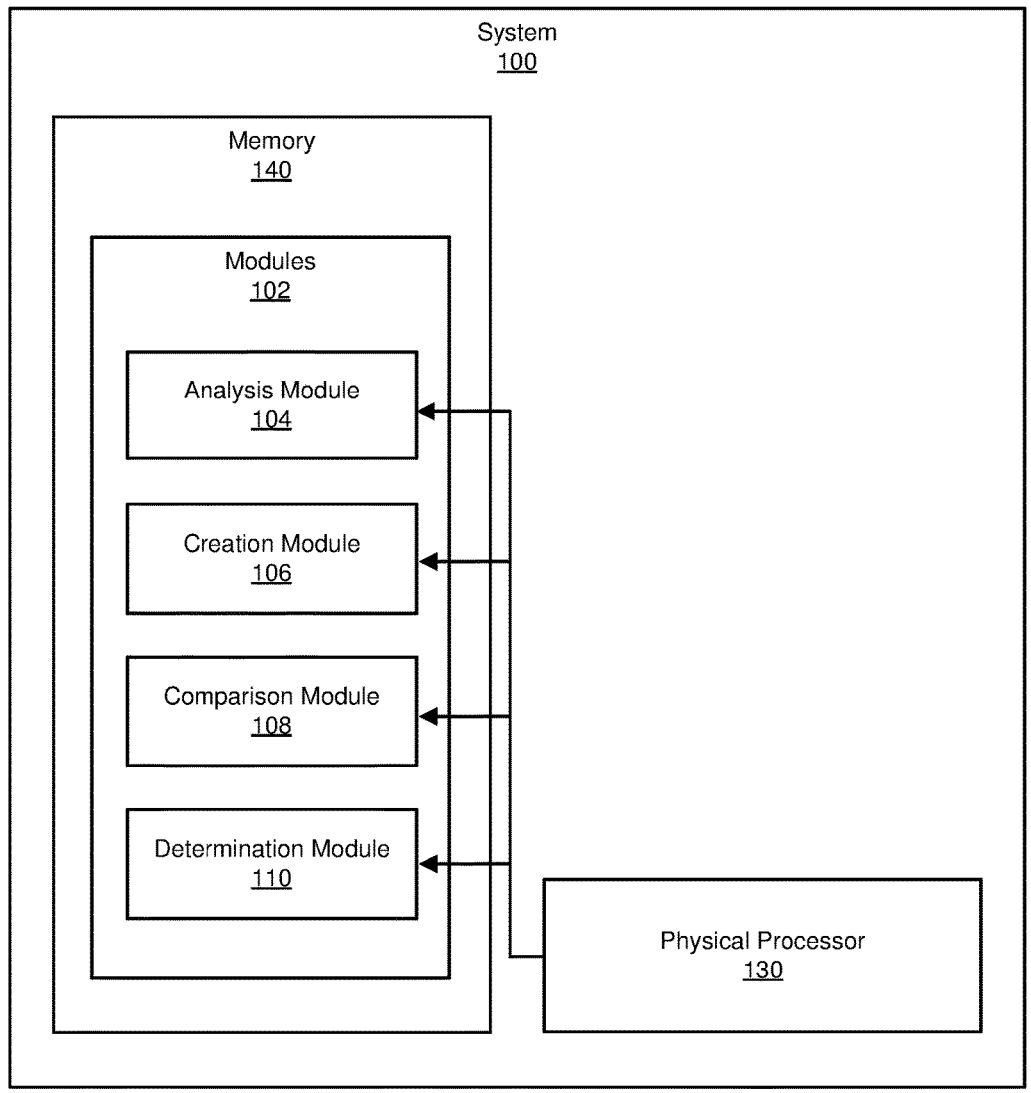
FIG. 1 is a block diagram of an example system for efficiently matching files.

Throughout the drawings, identical reference characters and descriptions indicate similar, but not necessarily identical, elements. While the example embodiments described herein are susceptible to various modifications and alternative forms, specific embodiments have been shown by way of example in the drawings and will be described in detail herein. However, the example embodiments described herein are not intended to be limited to the particular forms disclosed. Rather, the instant disclosure covers all modifications, equivalents, and alternatives falling within the scope of the appended claims.

DETAILED DESCRIPTION OF EXAMPLE EMBODIMENTS

The present disclosure is generally directed to systems and methods for efficiently matching files. As will be explained in greater detail below, by deriving a set of functions from a file and comparing a representation of the set of functions with representations of sets of functions from other files, the systems and methods described herein may be able to efficiently compare a large number of files while matching similar files that have been changed to evade detection. By matching files in this way, the systems and methods described herein may be able to improve the efficiency and accuracy of a security application that detects malicious files, thereby potentially reducing the amount of computing resources consumed by the security application (and thereby, e.g., improving the performance of the computing system for primary and/or non-system-level applications) and/or improving the security of a computing device. In addition, the systems and methods described herein may improve the functioning of a computing device by detecting potentially malicious files with increased accuracy and thus reducing the computing device's likelihood of infection. Additionally, the systems and methods described herein may enable files to be efficiently compared with previously categorized files in a variety of other contexts, including but not limited to improving the efficiency and effectiveness of data loss prevention systems that compare files to known sensitive files, detecting files that include intellectual property, and/or identifying usage of third-party libraries. In some examples, the systems and methods described herein may also improve the efficiency of systems that compare proprietary files to files owned by other entities in order to detect copied data, such as re-used proprietary code.

Figure 2:
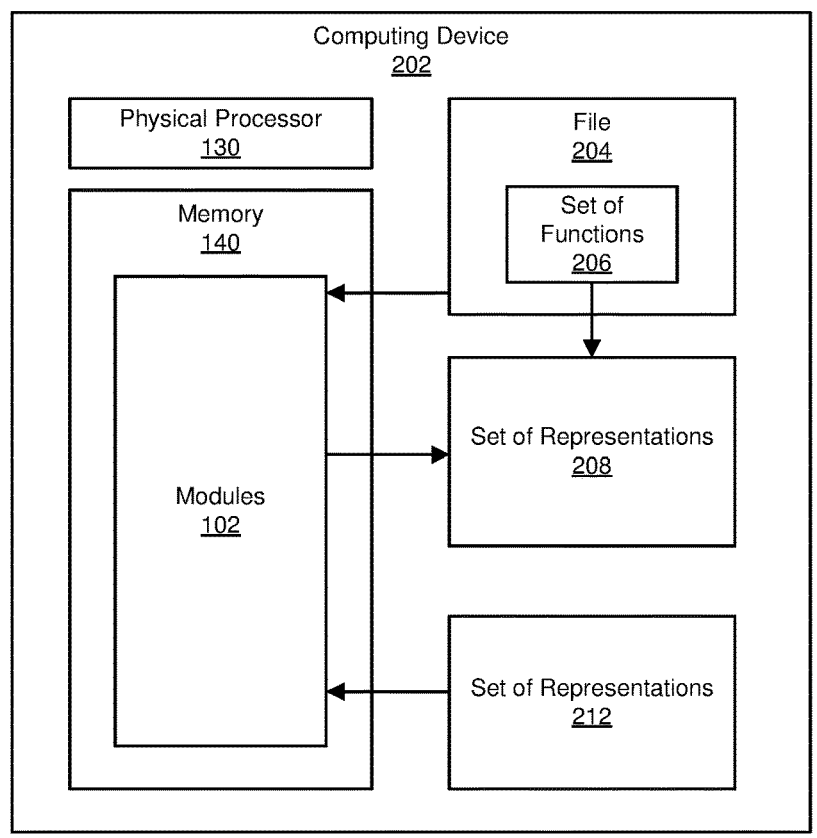
FIG. 2 is a block diagram of an additional example system for efficiently matching files.

The following will provide, with reference to FIGS. 1-2, detailed descriptions of example systems for efficiently matching files. Detailed descriptions of corresponding computer-implemented methods will also be provided in connection with FIGS. 3 and 5. Detailed descriptions of example function graphs will be provided in connection with FIG. 4. In addition, detailed descriptions of an example computing system and network architecture capable of implementing one or more of the embodiments described herein will be provided in connection with FIGS. 6 and 7, respectively.

FIG. 1 is a block diagram of example system 100 for efficiently matching files. As illustrated in this figure, example system 100 may include one or more modules 102 for performing one or more tasks. For example, and as will be explained in greater detail below, example system 100 may include an analysis module 104 that analyzes a file to identify a set of functions within the file and relationships between functions within the set of functions. Example system 100 may additionally include a creation module 106 that creates a set of representations for the set of functions by, for each function within the set of functions, combining a representation of a size of the function with a representation of a size of each function identified, when analyzing the file, as having a relationship to the function. Example system 100 may also include a comparison module 108 that compares the set of representations of the set of functions with a set of representations of an additional set of functions identified within an additional file. Example system 100 may additionally include a determination module 110 that determines, based on comparing the set of representations of the set of functions with the set of representations of the additional set of functions identified within the additional file, that the file matches the additional file. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent modules stored and configured to run on one or more computing devices, such as computing device 202 in FIG. 2. One or more of modules 102 in FIG. 1 may also represent all or portions of one or more special-purpose computers configured to perform one or more tasks.

As illustrated in FIG. 1, example system 100 may also include one or more memory devices, such as memory 140. Memory 140 generally represents any type or form of volatile or non-volatile storage device or medium capable of storing data and/or computer-readable instructions. In one example, memory 140 may store, load, and/or maintain one or more of modules 102. Examples of memory 140 include, without limitation, Random Access Memory (RAM), Read Only Memory (ROM), flash memory, Hard Disk Drives (HDDs), Solid-State Drives (SSDs), optical disk drives, caches, variations or combinations of one or more of the same, and/or any other suitable storage memory.

As illustrated in FIG. 1, example system 100 may also include one or more physical processors, such as physical processor 130. Physical processor 130 generally represents any type or form of hardware-implemented processing unit capable of interpreting and/or executing computer-readable instructions. In one example, physical processor 130 may access and/or modify one or more of modules 102 stored in memory 140. Additionally or alternatively, physical processor 130 may execute one or more of modules 102 to facilitate efficiently matching files. Examples of physical processor 130 include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, and/or any other suitable physical processor.

Example system 100 in FIG. 1 may be implemented in a variety of ways. For example, all or a portion of example system 100 may represent portions of example system 200 in FIG. 2. As shown in FIG. 2, system 200 may include a computing device 202. In one example, all or a portion of the functionality of modules 102 may be performed by computing device 202 and/or any other suitable computing system. As will be described in greater detail below, one or more of modules 102 from FIG. 1 may, when executed by at least one processor of computing device 202, enable computing device 202 to efficiently match files. For example, and as will be described in greater detail below, analysis module 104 may analyze a file 204 to identify a set of functions 206 within file 204 and relationships between functions within set of functions 206. Next, creation module 106 may create a set of representations 208 for set of functions 206 by, for each function within set of functions 206, combining a representation of a size of the function with a representation of a size of each function identified, when analyzing file 204, as having a relationship to the function. Either immediately afterwards or at some later time, comparison module 108 may compare set of representations 208 of set of functions 206 with a set of representations 212 of an additional set of functions identified within an additional file. Determination module 110 may determine, based on comparing set of representations 208 of set of functions 206 with set of representations 212 of the additional set of functions identified within the additional file, that file 204 matches the additional file.

Computing device 202 generally represents any type or form of computing device capable of reading computer-executable instructions. In some embodiments, computing device 202 may be an end-user device. In other embodiments, computing device 202 may be a file analysis server. Additional examples of computing device 202 include, without limitation, laptops, tablets, desktops, servers, cellular phones, Personal Digital Assistants (PDAs), multimedia players, embedded systems, wearable devices (e.g., smart watches, smart glasses, etc.), smart vehicles, smart packaging (e.g., active or intelligent packaging), gaming consoles, so-called Internet-of-Things devices (e.g., smart appliances, etc.), variations or combinations of one or more of the same, and/or any other suitable computing device.

File 204 generally represents any type or form of computing file. Set of functions 206 generally represents any group of one or more functions, methods, and/or subroutines within a computing file. Set of representations 208 and/or set of representations 212 generally represent any form of representation of a function, method, and/or subroutine.

Figure 3:
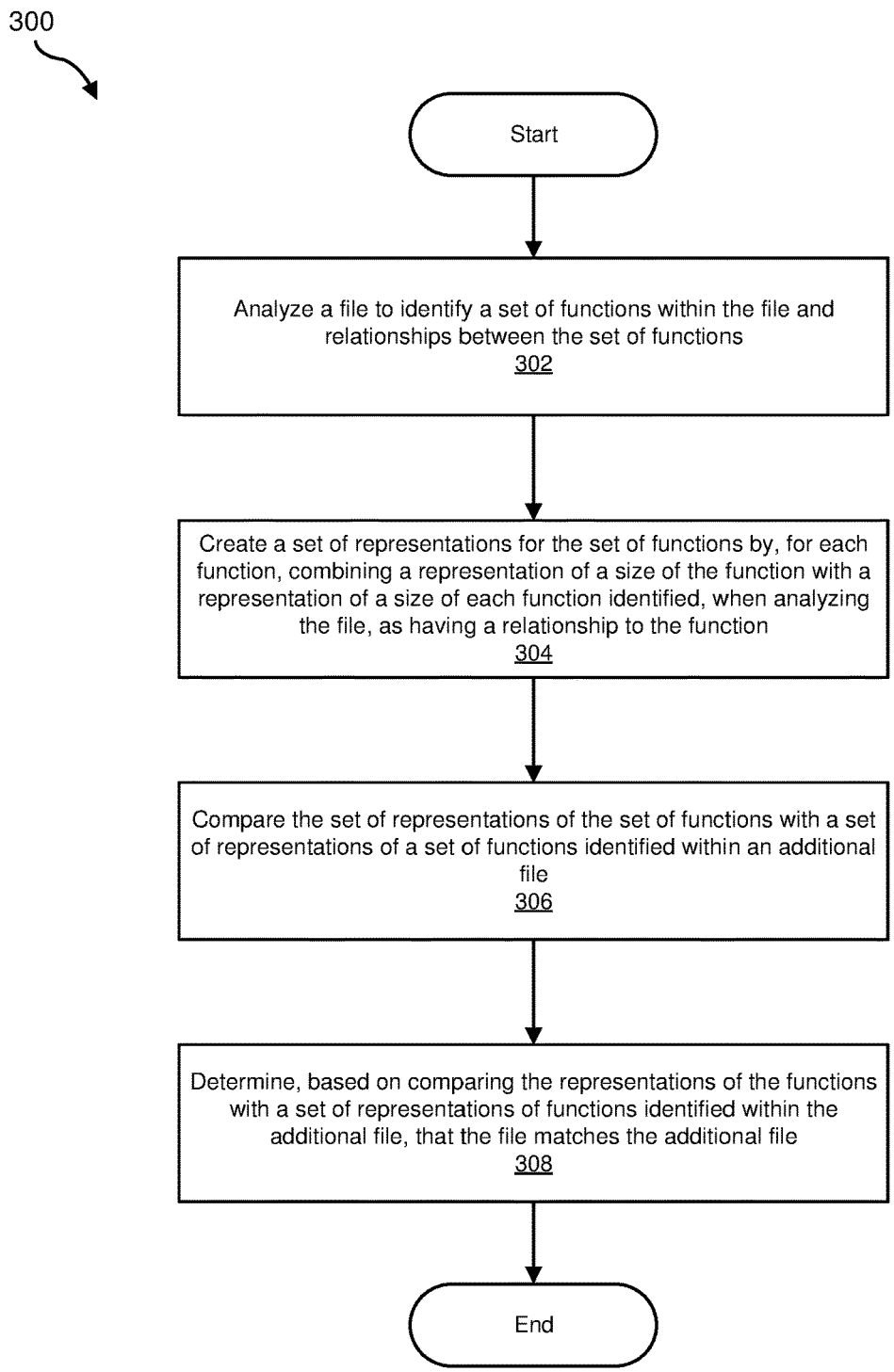
FIG. 3 is a flow diagram of an example method for efficiently matching files.

FIG. 3 is a flow diagram of an example computer-implemented method 300 for efficiently matching files. The steps shown in FIG. 3 may be performed by any suitable computer-executable code and/or computing system, including system 100 in FIG. 1, system 200 in FIG. 2, and/or variations or combinations of one or more of the same. In one example, each of the steps shown in FIG. 3 may represent an algorithm whose structure includes and/or is represented by multiple sub-steps, examples of which will be provided in greater detail below.

As illustrated in FIG. 3, at step 302, one or more of the systems described herein may analyze a file to identify a set of functions within the file and relationships between functions within the set of functions. For example, analysis module 104 may, as part of computing device 202 in FIG. 2, analyze file 204 to identify set of functions 206 within file 204 and relationships between functions within set of functions 206.

The term "file," as used herein, generally refers to any type of computing file that contains one or more functions. Examples of a file that may include a function include, without limitation, library files, application files, source code files, script files, resource files, binary files, driver files, executable files, and/or content of computer memory. In some embodiments, a file may be a suspicious file that was flagged by an anti-malware system as being a potentially malicious file. In other embodiments, the file may be a file that a user is attempting to transfer to another computing device that data loss prevention systems have flagged for review to determine whether the file is a sensitive file subject to data loss prevention rules. Additionally or alternatively, the file may be a code file that is suspected of containing proprietary code re-used from another organization, intellectual property, and/or libraries known to be buggy and/or vulnerable to attack.

The term "function," as used herein, generally refers to any section of a script, application, and/or program that performs one or more specified computing tasks. In some embodiments, a function may be and/or include a routine, method, procedure, and/or subroutine. In some examples, a function may be composed of one or more operations and/or commands. Examples of computing tasks performed by functions may include, without limitation, calling other functions, creating data, transforming data, deleting data, moving data, launching processes, terminating processes, and/or executing algorithms.

The term "relationship between functions," as used herein, generally refers to any connection between a function and another function. Examples of relationships between functions may include, without limitation, a relationship where one function calls the other function, a relationship where one function is called by the other function, a relationship where two functions both call a third function, and/or a relationship where two functions are both called by a third function.

Analysis module 104 may analyze the file in a variety of ways and/or contexts. For example, analysis module 104 may analyze the file in response to a security application identifying the file as potentially being malicious. In some examples, analysis module 104 may analyze a file in response to an analyst manually selecting the file for analysis. In some examples, analysis module 104 may analyze a file in response to a system determining that the file may match a potentially sensitive and/or proprietary file. In other examples, analysis module 104 may analyze every newly identified file on a computing device that hosts analysis module 104.

In some embodiments, analysis module 104 may analyze the file to identify the set of functions within the file and the relationships between the set of functions by disassembling the file into a symbolic language. In one example, analysis module 104 may disassemble the file from machine language code into a symbolic language. In some examples, analysis module 104 may not disassemble the file because the file may already be in an appropriate language for analysis by analysis module 104.

In some examples, analysis module 104 may identify relationships between functions within the set of functions by identifying a calling relationship between a calling function within the set of functions and a called function within the set of functions by determining that the calling function calls the called function. For example, analysis module 104 may analyze the code of a function to determine each function that the function calls and may record each function that the function calls as having a relationship with the function.

In some examples, analysis module 104 may identify relationships between functions and data. For example, analysis module may determine that a function references and/or otherwise makes use of data. In some embodiments, analysis module 104 may identify only outgoing relationships between functions and data. That is, analysis module 104 may identify one-way relationships where functions reference data but may not identify relationships outgoing relationships from data to other data and/or functions.

At step 304, one or more of the systems described herein may create a set of representations for the set of functions by, for each function within the set of functions, combining a representation of a size of the function with a representation of a size of each function identified, when analyzing the file, as having a relationship to the function. For example, creation module 106 may, as part of computing device 202 in FIG. 2, create set of representations 208 for set of functions 206 by, for each function within set of functions 206, combining a representation of a size of the function with a representation of a size of each function identified, when analyzing file 204, as having a relationship to the function.

The term "representation," as used herein, generally refers to any description of a function that may be used to identify the function. In some examples, a representation of a function may not uniquely identify a function. In some embodiments, a representation of a function may be an alphanumeric string. In one embodiment, a representation of a function may be a hash of the size of the function and the sizes of all functions called by the function.

Creation module 106 may create the representations of the set of functions in a variety of ways. In one embodiment, creation module 106 may create a representation of the set of functions that also includes one or more representations of data referenced by one or more of the functions. In some examples, creation module 106 may create the set of representations for the set of functions by combining a representation of a total number of instructions within a given function with a representation of the total number of instructions within each function identified as having the relationship to the given function. In some embodiments, the representation of the total number of instructions may be a representation of a total number of CPU instructions in machine language code. In other embodiments, the representation of the size of a function may be a representation of a number of lines of code in the function, a number of characters in the code of the function, and/or a size of the function in memory. In some embodiments, creation module 106 may create a representation of a size of a data node in a graph by measuring the size of the data on disk and/or in memory. In some examples, creation module 106 may round and/or scale the size of the data.

In one embodiment, creation module 106 may create the set of representations for the set of functions by creating a string by appending, in a predetermined order, the representation of the size of each function and/or item of data identified as having a relationship to the function to the representation of the size of the function and hashing the string. In one embodiment, creation module 106 may sort the representations of the sizes of the related functions and/or data by size before appending the representations. In one example, creation module 106 may sort the sizes in descending order. For example, if the number of instructions in the function is 10 and the function calls three functions that have 4, 18, and 7 instructions, respectively, creation module 106 may create the string "10,18,7,4". In other examples, creation module 106 may sort the sizes in descending order. By sorting the sizes, creation module 106 may decrease the likelihood that similar files that have the same functions and/or data in different orders will not match.

In one embodiment, creation module 106 may round the measurement of the size of the function and/or data to the nearest element of a predetermined numeric sequence that exhibits greater-than-linear growth. For example, creation module 106 may round the size of a function to the nearest number in the Fibonacci sequence. Continuing the example above, creation module 106 may round the sizes of 10, 18, 7, and 4 to 13, 21, 8, and 5. By rounding the sizes of the functions and/or data, creation module 106 may avoid allowing small changes in functions and/or data to prevent nearly-identical functions and/or data from matching. For example, an attacker modifying a piece of malware to avoid detection may add a meaningless line of code or rearrange several lines of code in order to change the signature of the malware. In one example, if an attacker changes the sizes of functions by a small amount, creation module 106 may still round the function sizes to the same Fibonacci number, resulting in the same representation of the modified and un-modified function.

Creation module 106 may use any suitable hashing algorithm to hash the combined representation of the size of the function and the sizes of the related functions and/or data. In some embodiments, creation module 106 may hash the string using a cryptographic hash function. In other embodiments, creation module 106 may create the hash from the string by using a multiplicative hash function.

Figure 4:
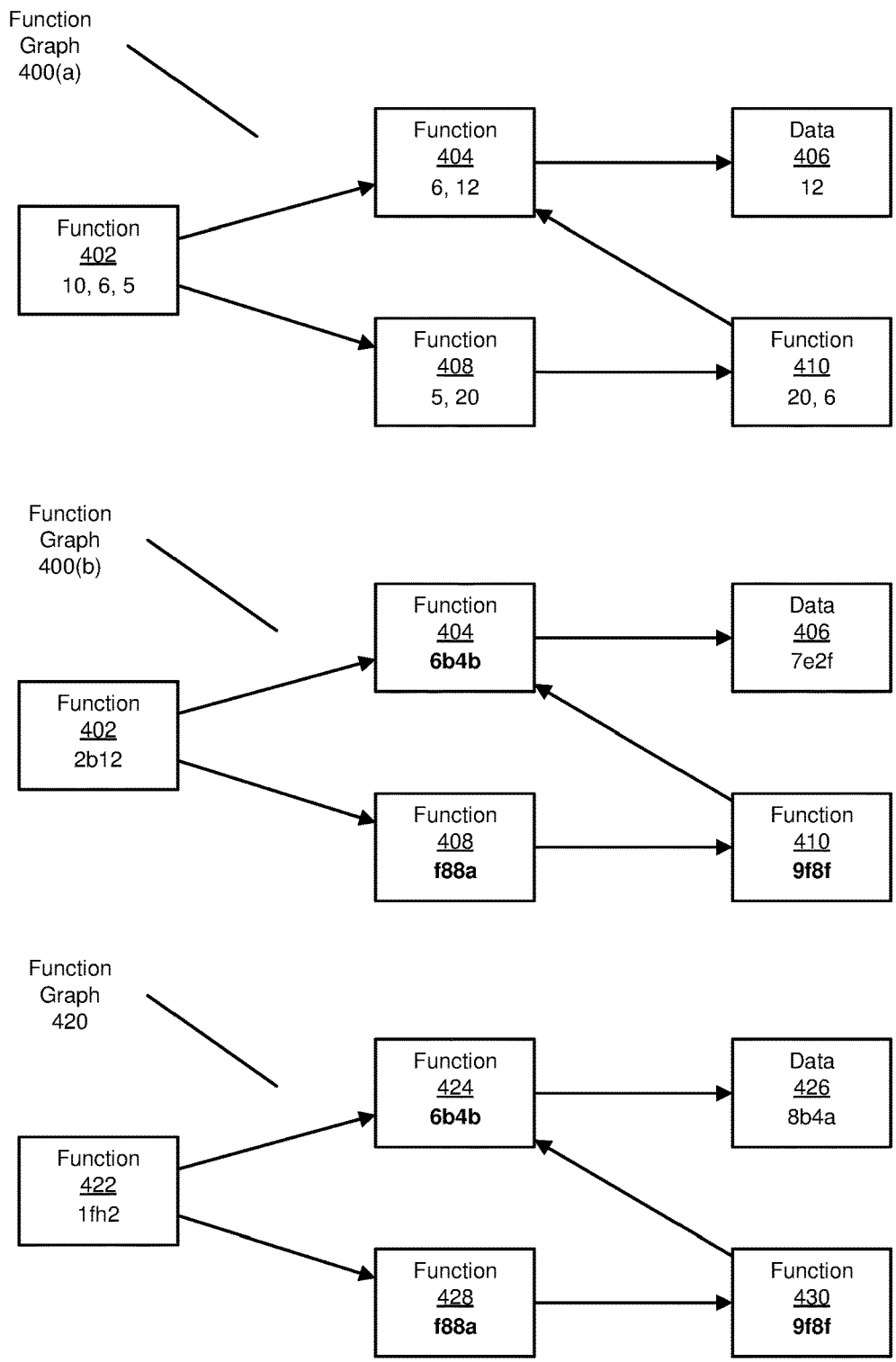
FIG. 4 is a block diagram of example function graphs.

In some examples, creation module 106 may create representations of functions and/or data by creating hashes that include the size of the function and the sizes of all of the functions called by the function and/or data referenced by the function. For example, as illustrated in FIG. 4, creation module 106 may create representations for functions 402, 404, 408, and/or 410 and/or data 406 in function graph 400(*a*). In this example, function 402 may have a size of 10, function 404 may have a size of 6, data 406 may have a size of 12, function 408 may have a size of 5, and/or function 410 may have a size of 20. In one example, function 402 may call functions 404 and/or 408. In this example, creation module 106 may append the sizes of functions 404 and/or 408 to the size of function 402 to create a string for function 402 that is "10, 6, 5". Similarly, creation module 106 may create a string of "6, 12" for function 404 because function 404 has a size of 6 and references data 406, which has a size of 12. In this example, data 406 may not have any outgoing relationships due to being data and so the string for data 406 may simply be "12". In this example, creation module 106 may also create a string of "5, 20" for function 408 which has a size of 5 and calls function 410 which has a size of 20 and/or may create a string of "20, 6" for function 410 which has a size of 20 and calls function 404 which has a size of 6.

In some embodiments, creation module 106 may then round each number in each string to the nearest Fibonacci number. In one example, creation module 106 may round the numbers in the string for function 402 to "13, 8, 5". In this example, creation module 106 may also round the sizes in the strings for the other functions to create the strings "8, 13", "13", "5, 21", and/or "21, 8" for function 404, data 406, and functions 408, and/or 410, respectively.

After creating a string for each function, creation module 106 may hash each of the strings to create a representation of the function. For example, creation module 106 may hash the strings for functions 402 and/or 404, data 406, and/or functions 408, and/or 410 to create the representations "2b12", "6b4b", "7e2f", "188a", and/or "9181", respectively, as illustrated in function graph 400(*b*).

In various embodiments, creation module 106 may use various types of relationships between functions, measurements of sizes of functions and/or data, rounding of sizes of functions and/or data, and/or hashing algorithms. However, creation module 106 may consistently select the same type of relationship between functions, measurement of sizes of functions and/or data, rounding of sizes of functions and/or data, and/or hashing algorithm when creating representations of functions in files that are to be compared to one another in order to enable the systems described herein to accurately compare the files.

Returning to FIG. 3, at step 306, one or more of the systems described herein may compare the set of representations of the set of functions with a set of representations of an additional set of functions identified within an additional file. For example, comparison module 108 may, as part of computing device 202 in FIG. 2, compare set of representations 208 of set of functions 206 with set of representations 212 of an additional set of functions identified within an additional file.

Comparison module 108 may compare the sets of representations of the functions and/or data in a variety of ways and/or contexts. In some examples, comparison module 108 may compare the set of representations of the set of functions and/or data with the set of representations of the additional set of functions and/or data identified within the additional file by comparing the set of representations of the set of functions and/or data with a plurality of sets of representations of a plurality of sets of functions and/or data identified within a plurality of files stored in a library of comparison reference files. For example, comparison module 108 may compare a set of representations of functions from a file that has been flagged as potentially malicious with sets of representations of functions from files known to be malicious. In another example, comparison module 108 may compare a set of representations of functions from a file that has been identified as potentially containing sensitive information with sets of representations of functions from files known to be subject to a data loss prevention policy.

In some examples, comparison module 108 may compare the set of representations of the set of functions and/or data with the set of representations of the additional set of functions and/or data identified within the additional file by comparing a subset of the set of representations of the functions and/or data with a subset of the set of representations of the additional set of functions and/or data identified within the additional file. In some examples, comparison module 108 may compare all of the functions and/or data within the sets but may determine that the sets of functions and/or data match if a subset from one set of functions and/or data matches a subset from another set of functions and/or data.

For example, returning to FIG. 4, comparison module 108 may compare the representations of functions 402, 404, 408, and/or 410 and/or data 406 in functions graph 400(*b*) with the representations of functions 422, 424, 428, and/or 430 and/or data 426 in function graph 420. In this example, the representation of functions 404, 408, and/or 410 may match the representations of functions 424, 428, and/or 430, respectively, while the other functions may not match one another. In some embodiments, comparison module 108 may determine that a sufficiently large subset of representations of functions in function graph 400(*b*) match representations of functions in function graph 420 and that therefore the two sets of representations of functions match. In some examples, a subset of functions may match another subset of functions without the full sets of functions matching because of other changes made to the file. In other examples, a subset of functions may match another subset of functions without the full sets of functions matching because an attacker may have injected malicious code into an otherwise benign file, and the subset of representations of the functions of the malicious code may match previously identified malicious functions while the rest of the functions may not match any previously identified malicious functions. In some examples, comparison module 108 may compare only the subset of representations of previously identified malicious functions with a subset of representations of functions from the file. In other examples, comparison module 108 may compare a subset of representations of functions from a file that contains proprietary code with a subset of representations of functions in a file that is suspected of containing re-used code.

In some examples, comparison module 108 may compare the set of representations of the set of functions with the set of representations of the set of functions identified within the additional file by training a machine learning classifier on a training set of data that includes the set of representations of the set of functions and using the machine learning classifier to compare the set of representations of the set of functions with the set of representations of the set of functions identified within the additional file. For example, comparison module 108 may use a bag-of-words model to represent a set of representations as a multiset of representations and/or may perform text clustering to train a machine learning classifier using the multiset. In some embodiments, comparison module 108 may use a neural network to analyze the sets of representations. In these embodiments, comparison module 108 may represent the sets of representations as two-dimensional matrices.

In some embodiments, comparison module 108 may create a report for a user that details the percentage of similarity between two sets of representations of functions and/or data and/or the number of representations of functions and/or data in one set that match representations in another set.

At step 308, one or more of the systems described herein may determine, based on comparing the set of representations of the set of functions with the set of representations of the additional set of functions identified within the additional file, that the file matches the additional file. For example, determination module 110 may, as part of computing device 202 in FIG. 2, determine, based on comparing set of representations 208 of set of functions 206 with set of representations 212 of the additional set of functions identified within the additional file, that file 204 matches the additional file.

Determination module 110 may determine that the file matches the additional file in a variety of ways and/or contexts. For example, determination module 110 may determine that the file matches the other file in response to comparison module 108 determining that the percentages of matches between the set of representations of functions and/or data and the additional set of representations of functions and/or data meets a predetermined threshold for matches between representations of functions. In some embodiments, determination module 110 and/or comparison module 108 may be located on a separate computing device from analysis module 104 and/or creation module 106. For example, analysis module 104 and/or creation module 106 may identify a file and create representations of a set of functions within a file and then send the representations to a server that stores a library of comparison files. In this example, comparison module 108 and/or determination module 110 may be hosted on the server. In some embodiments, determination module 110 may send a message to the computing system that hosts analysis module 104 and/or creation module 106 that indicates whether the file matches the additional file.

In some examples, determination module 110 may determine that the file matches the additional file even if the files are not identical. For example, the files may be different versions of the same application for different platforms. In this example, the files may be different but the structure of the files (i.e., which functions call which other functions) may be similar and determination module 110 may determine that the files match.

In one embodiment, determination module 110 may determine, based on determining that the file matches the additional file, that the file is malicious. For example, determination module 110 may determine that the file matches a known malicious file and therefore is a variant of the known malicious file. In another example, determination module 110 may determine that a subset of representations of functions from the file match a set of representations of known malicious functions and therefore the file has been compromised by malicious code. In some embodiments, determination module 110 may perform a security action on the file in response to determining that the file is malicious.

For example, determination module 110 may quarantine the file. Additionally or alternatively, determination module 110 may inform an administrator of the computing device about the malicious file, delete the malicious file, and/or perform further analysis on the malicious file.

Figure 5:
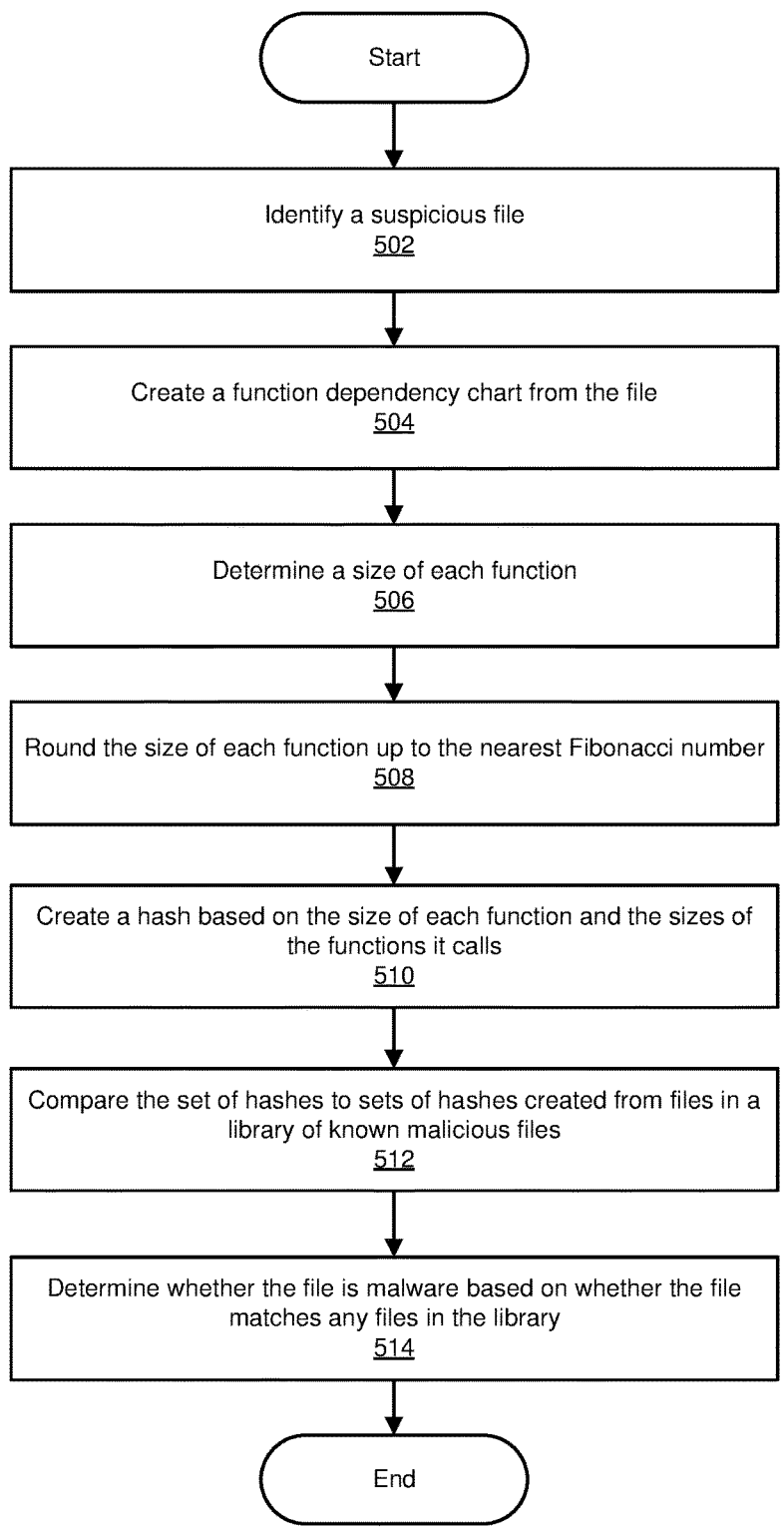
FIG. 5 is a flow diagram of an example method for efficiently matching files.

In some embodiments, the systems described herein may operate in the context of an anti-malware application. For example, as illustrated in FIG. 5, at step 502, the systems described herein may identify a suspicious file. In some embodiments, the systems described herein may directly identify a suspicious file. In other embodiments, the systems described herein may be directed to a suspicious file by another security application. At step 504, the systems described herein may create a function dependency chart from the file. In one embodiment, the systems described herein may create a function dependency chart by analyzing the file to identify all of the functions and then identifying each function that is called by each other function and recording the relationships between calling and called functions in a function dependency chart. At step 506, the systems described herein may determine a size of each function. In some embodiments, the size of a function may be the number of CPU instructions in a binary representation of the function. At step 508, the systems described herein may round the size of each function up to the nearest Fibonacci number. In other embodiments, the systems described herein may use other rounding functions, such as rounding the size to the nearest multiple of three, five, or ten.

At step 510, the systems described herein may create a hash based on the size of each function and the sizes of the functions that it calls. In some examples, the systems described herein may sort the sizes of the functions before concatenating the sorted sizes and hashing the result. At step 512, the systems described herein may compare the set of hashes to sets of hashes created from files in a library of known malicious files. In some embodiments, the systems described herein may perform this comparison on the computing device that hosts the suspicious file. In other embodiments, the systems described herein may send the set of hashes to a server that may perform the comparison. At step 514, the systems described herein may determine whether the file is malware based on whether the file matches any files in the library of known malware files. In some examples, if the systems described herein determine that the file is malware, the systems described herein may take any or all of a variety of appropriate security actions.

As described in connection with method 300 above, the systems and methods described herein may create a set of hashes that represents the sizes and structure of functions within a file and/or data referenced by functions within the file and then compare the set of hashes to sets of hashes created from other files in order to determine whether the file matches any of the other files. By comparing files via hashes, the systems described herein may quickly and efficiently compare one file to millions or potentially even billions of files. By performing small transformations on the data, such as rounding up the sizes of functions and sorting the order of functions, the systems described herein may match malware files that have been altered by malware creators to avoid detection but that still perform the same malicious actions and therefore retain the same basic structure. Additionally or alternatively, the systems described herein may identify proprietary code that has been re-used that may have been altered and/or partially obscured. The systems and methods described herein may increase the security and efficiency of computing devices by enabling computing devices to quickly determine whether suspicious files are variants of known malware and/or may increase the security of organizations by enabling organizations to quickly identify re-used proprietary code. Additionally or alternatively, the systems and methods described herein may quickly identify files that match code known to be vulnerable to attack, enabling administrators to identify and patch vulnerabilities. The systems and methods described herein may improve computational and/or organizational efficiency in any context that requires quickly comparing a file against a vast library of potentially matching or partially matching files.

Figure 6:
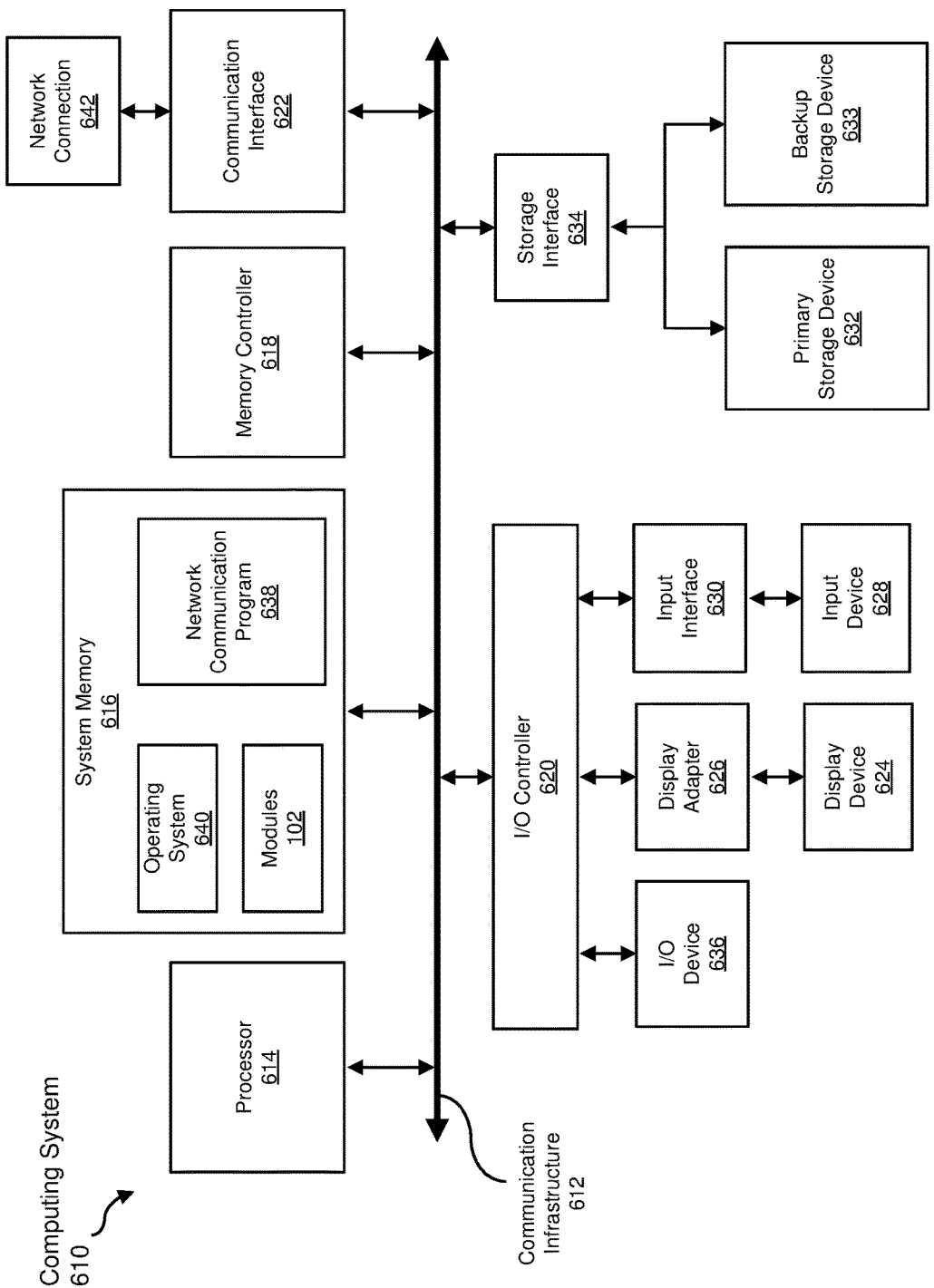
FIG. 6 is a block diagram of an example computing system capable of implementing one or more of the embodiments described and/or illustrated herein.

FIG. 6 is a block diagram of an example computing system 610 capable of implementing one or more of the embodiments described and/or illustrated herein. For example, all or a portion of computing system 610 may perform and/or be a means for performing, either alone or in combination with other elements, one or more of the steps described herein (such as one or more of the steps illustrated in FIG. 3). All or a portion of computing system 610 may also perform and/or be a means for performing any other steps, methods, or processes described and/or illustrated herein.

Computing system 610 broadly represents any single or multi-processor computing device or system capable of executing computer-readable instructions. Examples of computing system 610 include, without limitation, workstations, laptops, client-side terminals, servers, distributed computing systems, handheld devices, or any other computing system or device. In its most basic configuration, computing system 610 may include at least one processor 614 and a system memory 616.

Processor 614 generally represents any type or form of physical processing unit (e.g., a hardware-implemented central processing unit) capable of processing data or interpreting and executing instructions. In certain embodiments, processor 614 may receive instructions from a software application or module. These instructions may cause processor 614 to perform the functions of one or more of the example embodiments described and/or illustrated herein.

System memory 616 generally represents any type or form of volatile or non-volatile storage device or medium capable of storing data and/or other computer-readable instructions. Examples of system memory 616 include, without limitation, Random Access Memory (RAM), Read Only Memory (ROM), flash memory, or any other suitable memory device. Although not required, in certain embodiments computing system 610 may include both a volatile memory unit (such as, for example, system memory 616) and a non-volatile storage device (such as, for example, primary storage device 632, as described in detail below). In one example, one or more of modules 102 from FIG. 1 may be loaded into system memory 616.

In some examples, system memory 616 may store and/or load an operating system 640 for execution by processor 614. In one example, operating system 640 may include and/or represent software that manages computer hardware and software resources and/or provides common services to computer programs and/or applications on computing system 610. Examples of operating system 640 include, without limitation, LINUX, JUNOS, MICROSOFT WINDOWS, WINDOWS MOBILE, MAC OS, APPLE'S IOS, UNIX, GOOGLE CHROME OS, GOOGLE'S ANDROID, SOLARIS, variations of one or more of the same, and/or any other suitable operating system.

In certain embodiments, example computing system 610 may also include one or more components or elements in addition to processor 614 and system memory 616. For example, as illustrated in FIG. 6, computing system 610 may include a memory controller 618, an Input/Output (I/O) controller 620, and a communication interface 622, each of which may be interconnected via a communication infrastructure 612. Communication infrastructure 612 generally represents any type or form of infrastructure capable of facilitating communication between one or more components of a computing device. Examples of communication infrastructure 612 include, without limitation, a communication bus (such as an Industry Standard Architecture (ISA), Peripheral Component Interconnect (PCI), PCI Express (PCIe), or similar bus) and a network.

Memory controller 618 generally represents any type or form of device capable of handling memory or data or controlling communication between one or more components of computing system 610. For example, in certain embodiments memory controller 618 may control communication between processor 614, system memory 616, and I/O controller 620 via communication infrastructure 612.

I/O controller 620 generally represents any type or form of module capable of coordinating and/or controlling the input and output functions of a computing device. For example, in certain embodiments I/O controller 620 may control or facilitate transfer of data between one or more elements of computing system 610, such as processor 614, system memory 616, communication interface 622, display adapter 626, input interface 630, and storage interface 634.

As illustrated in FIG. 6, computing system 610 may also include at least one display device 624 coupled to I/O controller 620 via a display adapter 626. Display device 624 generally represents any type or form of device capable of visually displaying information forwarded by display adapter 626. Similarly, display adapter 626 generally represents any type or form of device configured to forward graphics, text, and other data from communication infrastructure 612 (or from a frame buffer, as known in the art) for display on display device 624.

As illustrated in FIG. 6, example computing system 610 may also include at least one input device 628 coupled to I/O controller 620 via an input interface 630. Input device 628 generally represents any type or form of input device capable of providing input, either computer or human generated, to example computing system 610. Examples of input device 628 include, without limitation, a keyboard, a pointing device, a speech recognition device, variations or combinations of one or more of the same, and/or any other input device.

Additionally or alternatively, example computing system 610 may include additional I/O devices. For example, example computing system 610 may include I/O device 636. In this example, I/O device 636 may include and/or represent a user interface that facilitates human interaction with computing system 610. Examples of I/O device 636 include, without limitation, a computer mouse, a keyboard, a monitor, a printer, a modem, a camera, a scanner, a microphone, a touchscreen device, variations or combinations of one or more of the same, and/or any other I/O device.

Communication interface 622 broadly represents any type or form of communication device or adapter capable of facilitating communication between example computing system 610 and one or more additional devices. For example, in certain embodiments communication interface 622 may facilitate communication between computing system 610 and a private or public network including additional computing systems. Examples of communication interface 622 include, without limitation, a wired network interface (such as a network interface card), a wireless network interface (such as a wireless network interface card), a modem, and any other suitable interface. In at least one embodiment, communication interface 622 may provide a direct connection to a remote server via a direct link to a network, such as the Internet. Communication interface 622 may also indirectly provide such a connection through, for example, a local area network (such as an Ethernet network), a personal area network, a telephone or cable network, a cellular telephone connection, a satellite data connection, or any other suitable connection.

In certain embodiments, communication interface 622 may also represent a host adapter configured to facilitate communication between computing system 610 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 622 may also allow computing system 610 to engage in distributed or remote computing. For example, communication interface 622 may receive instructions from a remote device or send instructions to a remote device for execution.

In some examples, system memory 616 may store and/or load a network communication program 638 for execution by processor 614. In one example, network communication program 638 may include and/or represent software that enables computing system 610 to establish a network connection 642 with another computing system (not illustrated in FIG. 6) and/or communicate with the other computing system by way of communication interface 622. In this example, network communication program 638 may direct the flow of outgoing traffic that is sent to the other computing system via network connection 642. Additionally or alternatively, network communication program 638 may direct the processing of incoming traffic that is received from the other computing system via network connection 642 in connection with processor 614.

Although not illustrated in this way in FIG. 6, network communication program 638 may alternatively be stored and/or loaded in communication interface 622. For example, network communication program 638 may include and/or represent at least a portion of software and/or firmware that is executed by a processor and/or Application Specific Integrated Circuit (ASIC) incorporated in communication interface 622.

As illustrated in FIG. 6, example computing system 610 may also include a primary storage device 632 and a backup storage device 633 coupled to communication infrastructure 612 via a storage interface 634. Storage devices 632 and 633 generally represent any type or form of storage device or medium capable of storing data and/or other computer-readable instructions. For example, storage devices 632 and 633 may be a magnetic disk drive (e.g., a so-called hard drive), a solid state drive, a floppy disk drive, a magnetic tape drive, an optical disk drive, a flash drive, or the like. Storage interface 634 generally represents any type or form of interface or device for transferring data between storage devices 632 and 633 and other components of computing system 610.

In certain embodiments, storage devices 632 and 633 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 632 and 633 may also include other similar structures or devices for allowing computer software, data, or other computer-readable instructions to be loaded into computing system 610. For example, storage devices 632 and 633 may be configured to read and write software, data, or other computer-readable information. Storage devices 632 and 633 may also be a part of computing system 610 or may be a separate device accessed through other interface systems.

Many other devices or subsystems may be connected to computing system 610. Conversely, all of the components and devices illustrated in FIG. 6 need not be present to practice the embodiments described and/or illustrated herein. The devices and subsystems referenced above may also be interconnected in different ways from that shown in FIG. 6. Computing system 610 may also employ any number of software, firmware, and/or hardware configurations. For example, one or more of the example embodiments disclosed herein may be encoded as a computer program (also referred to as computer software, software applications, computer-readable instructions, or computer control logic) on a computer-readable medium. The term "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The computer-readable medium containing the computer program may be loaded into computing system 610. All or a portion of the computer program stored on the computer-readable medium may then be stored in system memory 616 and/or various portions of storage devices 632 and 633. When executed by processor 614, a computer program loaded into computing system 610 may cause processor 614 to perform and/or be a means for performing the functions of one or more of the example embodiments described and/or illustrated herein. Additionally or alternatively, one or more of the example embodiments described and/or illustrated herein may be implemented in firmware and/or hardware. For example, computing system 610 may be configured as an Application Specific Integrated Circuit (ASIC) adapted to implement one or more of the example embodiments disclosed herein.

Figure 7:
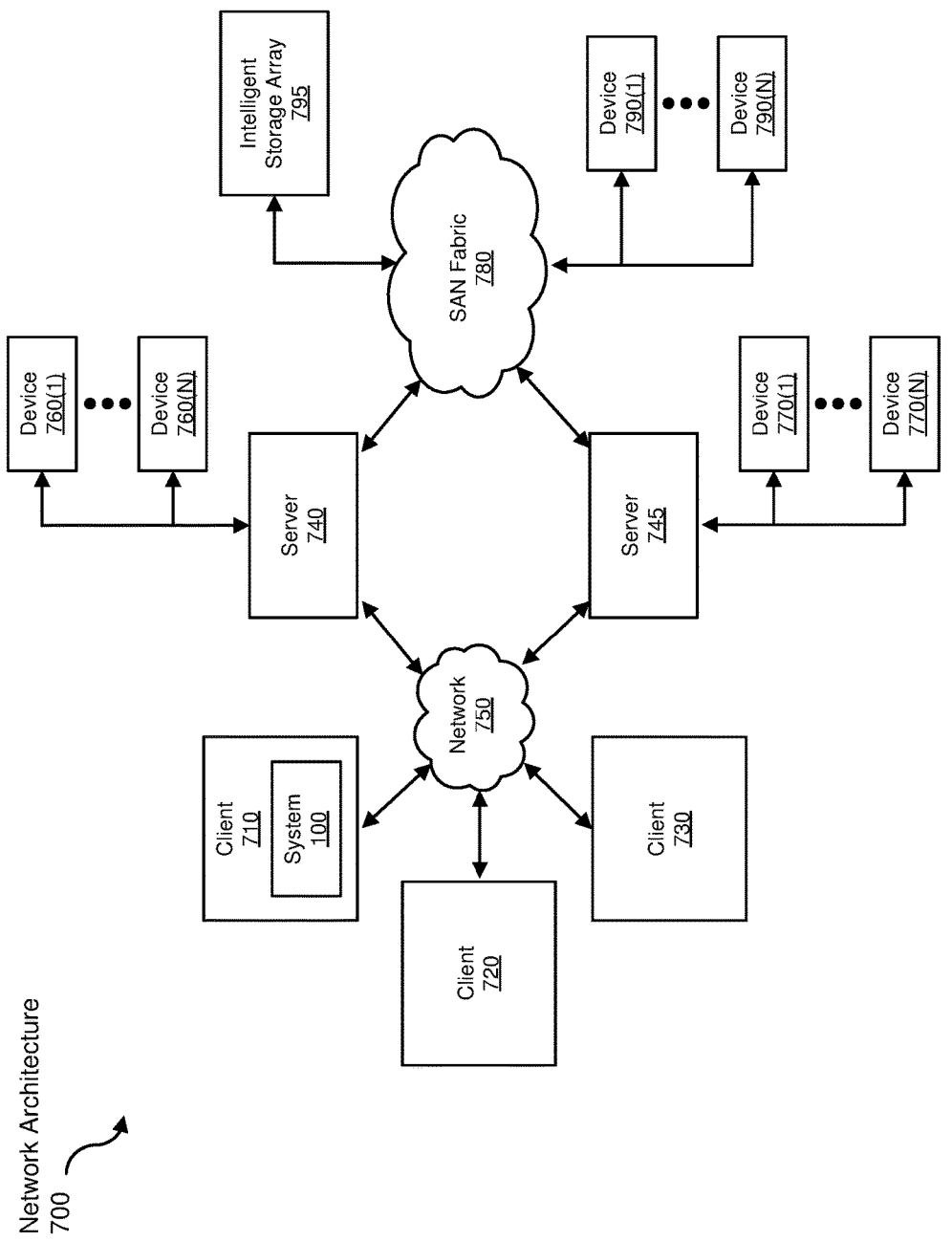
FIG. 7 is a block diagram of an example computing network capable of implementing one or more of the embodiments described and/or illustrated herein.

FIG. 7 is a block diagram of an example network architecture 700 in which client systems 710, 720, and 730 and servers 740 and 745 may be coupled to a network 750. As detailed above, all or a portion of network architecture 700 may perform and/or be a means for performing, either alone or in combination with other elements, one or more of the steps disclosed herein (such as one or more of the steps illustrated in FIG. 3). All or a portion of network architecture 700 may also be used to perform and/or be a means for performing other steps and features set forth in the instant disclosure.

Client systems 710, 720, and 730 generally represent any type or form of computing device or system, such as example computing system 610 in FIG. 6. Similarly, servers 740 and 745 generally represent computing devices or systems, such as application servers or database servers, configured to provide various database services and/or run certain software applications. Network 750 generally represents any telecommunication or computer network including, for example, an intranet, a WAN, a LAN, a PAN, or the Internet. In one example, client systems 710, 720, and/or 730 and/or servers 740 and/or 745 may include all or a portion of system 100 from FIG. 1.

As illustrated in FIG. 7, one or more storage devices 760(1)-(N) may be directly attached to server 740. Similarly, one or more storage devices 770(1)-(N) may be directly attached to server 745. Storage devices 760(1)-(N) and storage devices 770(1)-(N) generally represent any type or form of storage device or medium capable of storing data and/or other computer-readable instructions. In certain embodiments, storage devices 760(1)-(N) and storage devices 770(1)-(N) may represent Network-Attached Storage (NAS) devices configured to communicate with servers 740 and 745 using various protocols, such as Network File System (NFS), Server Message Block (SMB), or Common Internet File System (CIFS).

Servers 740 and 745 may also be connected to a Storage Area Network (SAN) fabric 780. SAN fabric 780 generally represents any type or form of computer network or architecture capable of facilitating communication between a plurality of storage devices. SAN fabric 780 may facilitate communication between servers 740 and 745 and a plurality of storage devices 790(1)-(N) and/or an intelligent storage array 795. SAN fabric 780 may also facilitate, via network 750 and servers 740 and 745, communication between client systems 710, 720, and 730 and storage devices 790(1)-(N) and/or intelligent storage array 795 in such a manner that devices 790(1)-(N) and array 795 appear as locally attached devices to client systems 710, 720, and 730. As with storage devices 760(1)-(N) and storage devices 770(1)-(N), storage devices 790(1)-(N) and intelligent storage array 795 generally represent any type or form of storage device or medium capable of storing data and/or other computer-readable instructions.

In certain embodiments, and with reference to example computing system 610 of FIG. 6, a communication interface, such as communication interface 622 in FIG. 6, may be used to provide connectivity between each client system 710, 720, and 730 and network 750. Client systems 710, 720, and 730 may be able to access information on server 740 or 745 using, for example, a web browser or other client software. Such software may allow client systems 710, 720, and 730 to access data hosted by server 740, server 745, storage devices 760(1)-(N), storage devices 770(1)-(N), storage devices 790(1)-(N), or intelligent storage array 795. Although FIG. 7 depicts the use of a network (such as the Internet) for exchanging data, the embodiments described and/or illustrated herein are not limited to the Internet or any particular network-based environment.

In at least one embodiment, all or a portion of one or more of the example embodiments disclosed herein may be encoded as a computer program and loaded onto and executed by server 740, server 745, storage devices 760(1)-(N), storage devices 770(1)-(N), storage devices 790(1)-(N), intelligent storage array 795, or any combination thereof. All or a portion of one or more of the example embodiments disclosed herein may also be encoded as a computer program, stored in server 740, run by server 745, and distributed to client systems 710, 720, and 730 over network 750.

As detailed above, computing system 610 and/or one or more components of network architecture 700 may perform and/or be a means for performing, either alone or in combination with other elements, one or more steps of an example method for efficiently matching files.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered example in nature since many other architectures can be implemented to achieve the same functionality.

In some examples, all or a portion of example system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of example system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of example system 100 in FIG. 1 may be implemented within a virtual environment. For example, the modules and/or data described herein may reside and/or execute within a virtual machine. As used herein, the term "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the term "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of example system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of example system 100 in FIG. 1 may represent portions of, interact with, consume data produced by, and/or produce data consumed by one or more systems for information management. As used herein, the term "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of example system 100 in FIG. 1 may represent portions of, produce data protected by, and/or communicate with one or more systems for information security. As used herein, the term "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of example system 100 in FIG. 1 may represent portions of, communicate with, and/or receive protection from one or more systems for endpoint security. As used herein, the term "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various example methods described and/or illustrated herein may also omit one or more of the steps described or illustrated herein or include additional steps in addition to those disclosed.

While various embodiments have been described and/or illustrated herein in the context of fully functional computing systems, one or more of these example embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the example embodiments disclosed herein.

In addition, one or more of the modules described herein may transform data, physical devices, and/or representations of physical devices from one form to another. For example, one or more of the modules recited herein may receive file data to be transformed, transform the file data into a set of representations of functions, output a result of the transformation to a comparison module, use the result of the transformation to compare the file to another file, and store the result of the transformation to memory. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the example embodiments disclosed herein. This example description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for efficiently matching files, at least a portion of the method being performed by a computing device comprising at least one processor, the method comprising:
   analyzing a file to identify a set of functions within the file and relationships between functions within the set of functions;
   creating a set of representations for the set of functions by, for each function within the set of functions;
      combining a representation of a size of the function with a representation of a size of each function identified, when analyzing the file, as having a relationship to the function; and
      combining a representation of a total number of instructions within a given function with a representation of the total number of instructions within each function identified as having the relationship to the given function;
   comparing a subset of the set of representations of the set of functions with a subset of a set of representations of an additional set of functions identified within an additional file; and
   determining, based on comparing the subset of the set of representations of the set of functions with the subset of the set of representations of the additional set of functions identified within the additional file, that the file matches the additional file.

2. The computer-implemented method of claim 1, further comprising determining, based on determining that the file matches the additional file, that the file is malicious.

3. The computer-implemented method of claim 2, further comprising performing a security action on the file in response to determining that the file is malicious.

4. The computer-implemented method of claim 3, wherein performing the security action comprises quarantining the file.

5. The computer-implemented method of claim 1, wherein analyzing the file to identify the set of functions within the file and the relationships between the set of functions comprises disassembling the file.

6. The computer-implemented method of claim 1, wherein identifying relationships between functions within the set of functions comprises identifying a calling relationship between a calling function within the set of functions and a called function within the set of functions by determining that the calling function calls the called function.

7. The computer-implemented method of claim 1, creating the set of representations for the set of functions comprises:
 creating a string by appending, in a predetermined order, the representation of the size of each function identified, when analyzing the file, as having a relationship to the function to the representation of the size of the function; and
 hashing the string.

8. The computer-implemented method of claim 1, wherein the representation of the size of the function comprises a measurement of the size of the function rounded to a nearest element of a predetermined numeric sequence that exhibits greater-than-linear growth.

9. The computer-implemented method of claim 1, wherein comparing the subset of the set of representations of the set of functions with the subset of the set of representations of the additional set of functions identified within the additional file comprises comparing the subset of the set of representations of the set of functions with a plurality of sets of representations of a plurality of sets of functions identified within a plurality of files stored in a library of comparison reference files.

10. The computer-implemented method of claim 1, wherein comparing the subset of the set of representations of the set of functions with the subset of the set of representations of the set of functions identified within the additional file comprises:
 training a machine learning classifier on a training set of data that comprises the set of representations of the set of functions; and
 using the machine learning classifier to compare the set of representations of the set of functions with the set of representations of the set of functions identified within the additional file.

11. A system for efficiently matching files, the system comprising:
 an analysis module, stored in memory, that analyzes a file to identify a set of functions within the file and relationships between functions within the set of functions;
 a creation module, stored in memory, that creates a set of representations for the set of functions by, for each function within the set of functions;
 combining a representation of a size of the function with a representation of a size of each function identified, when analyzing the file, as having a relationship to the function; and
 combining a representation of a total number of instructions within a given function with a representation of the total number of instructions within each function identified as having the relationship to the given function;
 a comparison module, stored in memory, that compares a subset of the set of representations of the set of functions with a subset of a set of representations of an additional set of functions identified within an additional file;
 a determination module, stored in memory, that determines, based on comparing the subset of the set of representations of the set of functions with the subset of the set of representations of the additional set of functions identified within the additional file, that the file matches the additional file; and
 at least one physical processor configured to execute the analysis module, the creation module, the comparison module, and the determination module.

12. The system of claim 11, wherein the determination module determines, based on determining that the file matches the additional file, that the file is malicious.

13. The system of claim 12, wherein the determination module performs a security action on the file in response to determining that the file is malicious.

14. The system of claim 13, wherein the determination module performs the security action by quarantining the file.

15. The system of claim 11, wherein the analysis module analyzes the file to identify the set of functions within the file and the relationships between the set of functions by disassembling the file.

16. The system of claim 11, where the analysis module identifies relationships between functions within the set of functions by identifying a calling relationship between a calling function within the set of functions and a called function within the set of functions by determining that the calling function calls the called function.

17. A non-transitory computer-readable medium comprising one or more computer-readable instructions that, when executed by at least one processor of a computing device, cause the computing device to:
 analyze a file to identify a set of functions within the file and relationships between functions within the set of functions;
 create a set of representations for the set of functions by, for each function within the set of functions;
 combining a representation of a size of the function with a representation of a size of each function identified, when analyzing the file, as having a relationship to the function; and
 combining a representation of a total number of instructions within a given function with a representation of the total number of instructions within each function identified as having the relationship to the given function;
 compare a subset of the set of representations of the set of functions with a subset of a set of representations of an additional set of functions identified within an additional file; and
 determine, based on comparing the subset of the set of representations of the set of functions with the subset of the set of representations of the additional set of functions identified within the additional file, that the file matches the additional file.

* * * * *